Reissued Nov. 15, 1932 Re. 18,652

UNITED STATES PATENT OFFICE

WILLIAM W. SMITH, OF BUFFALO, NEW YORK, ASSIGNOR TO THE DOW CHEMICAL COMPANY, OF MIDLAND, MICHIGAN, A CORPORATION OF MICHIGAN

CASTING READILY OXIDIZABLE METALS

No Drawing. Original No. 1,761,498, dated June 3, 1930, Serial No. 271,113, filed April 18, 1928. Application for reissue filed April 4, 1932. Serial No. 603,195.

This invention relates to the casting of freely oxidizable metals such for example, as magnesium and high magnesium alloys, and to the compositions for the forming of molds for use in connection with the molding of such metals.

The objects of this invention are to provide a method of casting freely oxidizable metals in such a manner as to prevent the metals from reacting with moisture contained in the mold; also to produce a molding composition which will form castings having smooth surfaces free from sand holes, and which prevents the burning or oxidation of magnesium or other readly oxidizable metals; also to provide a composition of this kind which does not penetrate the casting and which does not in any way change the appearance or composition of the metal; also to provide a composition of this kind which may be used repeatedly and which can be easily worked or molded; also to improve molding compositions of this kind in other respects hereinafter specified.

In accordance with my invention, sand and graphite which have heretofore been used in connection with molding of readily oxidizable metals are replaced by pulverized or finely divided carbon. Sand has the disadvantage that it has a tendency to penetrate the surface of the casting and consequently roughens the surface and forms sand holes therein. Graphite discolors the casting by darkening the same, which renders the use of graphite objectionable. I have found that pulverized carbon does not have the objections of either sand or graphite and does not deteriorate with repeated use in molds and has no chemical reaction whatever with magnesium. Pulverized carbon may be used in various proportions from 50 to 90 per cent by volume.

My improved molding composition also includes magnesium oxide in varying proportions from 5 to 50 per cent.

Magnesium oxide can be either mixed into the molding composition or may also be used for dusting on the surfaces of the mold with which the molten metal contacts. The magnesium oxide may be used repeatedly in the making of castings.

Powdered or finely divided soapstone is also added to the molding composition in varying proportions from approximately 2 to 15 per cent by volume. This material is chemically inert with reference to magnesium and other metals and can be readily freed from water and has the property of making the molding composition more or less adhesive and makes the composition pack, so that the composition will retain the form or shape into which it is molded. Soapstone together with the light paraffin oil hereinafter referred to forms a bond or binder between the carbon particles and consequently in case the composition is used for making comparatively flat castings or castings made from simple patterns, smaller percentages of soapstone can be used while in the making of more complicated castings which require considerable draw, larger percentages of soapstone are required.

In order to moisten these three finely divided or pulverized materials to form a mass that can be molded, I employ a mineral oil of light body. This oil is used in quantities sufficient to moisten the material and enable the material to retain the form into which it is molded. A light bodied paraffin oil of specific gravity of about .875, a flash point of about 310° F., and a fire point of 355° F. has been successfully used in my improved molding composition.

During the use of the mold some of this oil is evaporated and when it is desired to again use the remaining molding composition for making additional castings, it is merely necessary to add sufficient oil to again moisten the material, the other ingredients of the molding composition remaining substantially unchanged during their use.

In accordance with my improved process of casting readily oxidizable metals, pulverized carbon and powdered soapstone are mixed in the desired proportions and magnesium oxide may be added if desired. To these dry materials is added sufficient of the light bodied paraffin oil to moisten the mass so that the same can be molded. The material is then formed into a mold in the usual manner as in the case of sand molds and magnesium oxide may then be dusted on the portions of the mold with which the metal contacts. The metal may then be poured into the mold. In the case that magnesium oxide is added to the molding composition, the dusting of the mold with magnesium oxide may be omitted, but in many cases it is desirable to use magnesium oxide both in the composition and for covering the surfaces of the mold with which the metal contacts.

The composition described has the advantages that it is free from sand and that none of the materials used therein are hygroscopic. The magnesium oxide is an important ingredient of this composition in that it prevents the magnesium from burning or oxidizing. Castings made by using my improved molding composition are "sand proof" and without scale or rough surfaces and consequently can be made with greater accuracy by the use of this molding composition and the surfaces thereof are much smoother than castings made in sand molds so that the machining of castings made with my molding composition is greatly reduced. The oil used, being light bodied, does not form a permanent carbon bond between the particles used in the mold, but volatilizes either entirely or partly when the metal is poured into the mold, so that the mixture of solids included in the composition may be repeatedly used in molding readily oxidizable metals, as is sand in the case of molding iron, brass and other metals. More mineral oil is added as required, when the solids are again used for making a mold.

I claim as my invention:—

1. A mold containing pulverized carbon, pulverized soapstone, a temporary liquid binder and having magnesium oxide on the portions thereof with which the metal contacts.

2. A mold made of about 50 to 90 per cent of pulverized carbon, from 2 to 15 per cent of powdered soapstone, and the balance of magnesium oxide and sufficient light bodied mineral oil to moisten the mixture, the surfaces of the mold which are to contact with the molten metal being dusted with magnesium oxide.

3. The process of making castings of metals which are freely oxidizable, which consists of pouring the metal in molten form into a mold containing powdered carbon, magnesium oxide and a temporary binder.

4. The process of making castings of metals which are freely oxidizable, which consists of pouring the metal in molten form into a mold containing powdered carbon, magnesium oxide, powered soapstone, and a light bodied mineral oil.

5. The process of making castings of metals which are freely oxidizable, which consists of pouring the metal in molten form into a mold containing powdered carbon, magnesium oxide, powdered soapstone, and a light bodied mineral oil and having the surfaces of the mold which contact with the metal dusted with magnesium oxide.

6. The process of making castings of metals which are freely oxidizable, which consists of pouring the metal in molten form into a mold containing powdered carbon and a temporary binder, and having magnesium oxide covering the surface of the mold with which the metal contacts.

Signed by me this 29th day of March, 1932.

WILLIAM W. SMITH.